(12) United States Patent
Barnes et al.

(10) Patent No.: US 8,359,162 B2
(45) Date of Patent: Jan. 22, 2013

(54) TERRAIN CORRECTION SYSTEMS

(75) Inventors: Gary Barnes, Cambridgeshire (GB); Danian Huang, Cambridgeshire (GB)

(73) Assignee: Arkex Limited, Cambridge (GB)

( * ) Notice: Subject to any disclaimer, the term of this patent is extended or adjusted under 35 U.S.C. 154(b) by 550 days.

(21) Appl. No.: 12/449,823

(22) PCT Filed: Feb. 21, 2008

(86) PCT No.: PCT/GB2008/050113
§ 371 (c)(1),
(2), (4) Date: Aug. 28, 2009

(87) PCT Pub. No.: WO2008/117081
PCT Pub. Date: Oct. 2, 2008

(65) Prior Publication Data
US 2010/0094556 A1   Apr. 15, 2010

(30) Foreign Application Priority Data

Mar. 23, 2007   (GB) .................................. 0705605.4

(51) Int. Cl.
*G01V 3/38* (2006.01)
(52) U.S. Cl. .......................................................... 702/5
(58) Field of Classification Search ....... 702/5; 324/344
See application file for complete search history.

(56) References Cited

U.S. PATENT DOCUMENTS

| | | | |
|---|---|---|---|
| 4,724,390 A * | 2/1988 | Rauscher et al. | 324/344 |
| 5,112,126 A | 5/1992 | Braebner | |
| 7,065,449 B2 * | 6/2006 | Brewster et al. | 702/5 |
| 2005/0197773 A1 | 9/2005 | Brewster et al. | |
| 2006/0036367 A1 | 2/2006 | Brewster | |
| 2009/0252372 A1 | 10/2009 | Davies | |
| 2009/0287464 A1 | 11/2009 | Barnes | |

FOREIGN PATENT DOCUMENTS

| | | |
|---|---|---|
| GB | 2 435 523 A | 8/2007 |
| GB | 2 446 174 A | 6/2008 |

(Continued)

OTHER PUBLICATIONS

S. Hammer, "Topographic and Terrain Correction for Airborne Gravity," Geographics, vol. 39:4, Aug. 1974, pp. 537-542.
Y. C. Li et al., "Improved Gravimetric Terrain Corrections," Geophysics Journal International, vol. 119:3, Dec. 1994, XP-002502769, pp. 740-752.
P. Ameti, "Downward Continuation of Geopotential in Switzerland," and [online] 2006, pp. 26-30 and 35-41, XP002502768, URL:http://tuprints.ulb.tu-darmstadt.de/epda/000671/ameti_thesis .pdf>.

(Continued)

*Primary Examiner* — Jonathan C Teixeira Moffat
*Assistant Examiner* — Xiuquin Sun
(74) *Attorney, Agent, or Firm* — Foley & Lardner LLP

(57) ABSTRACT

A method, apparatus and computer program code for processing data from potential field surveys, particularly airborne gravity field surveys, to correct for the effects of terrain. A method of processing potential field measurement data from a moving platform survey for mapping a field includes data defining a time series of potential field measurements captured by a potential field measurement instrument mounted on a moving platform, each of the measurements having associated data defining positions, inputting terrain data defining a spatial variation of terrain surveyed, determining time-domain correction data to be applied to the measured potential field data in the time-domain, and adjusting the measured potential field data defining the time series of potential field measurements using the time-domain correction data to provide terrain corrected measured potential field data for the mapping of the field.

13 Claims, 4 Drawing Sheets

FOREIGN PATENT DOCUMENTS

| | | |
|---|---|---|
| RU | 2221263 C1 | 1/2004 |
| RU | 2254599 C1 | 6/2005 |
| RU | 2008134480 A | 2/2010 |
| RU | 2009132490 A | 3/2011 |
| WO | WO 03/030215 A1 | 4/2003 |
| WO | WO 03/032015 A1 | 4/2003 |
| WO | WO 2007/012895 A2 | 2/2007 |

OTHER PUBLICATIONS

Decision to Grant and English translation issued in RU application No. 2009139072; Jun. 20, 2012; 14 pages.

* cited by examiner

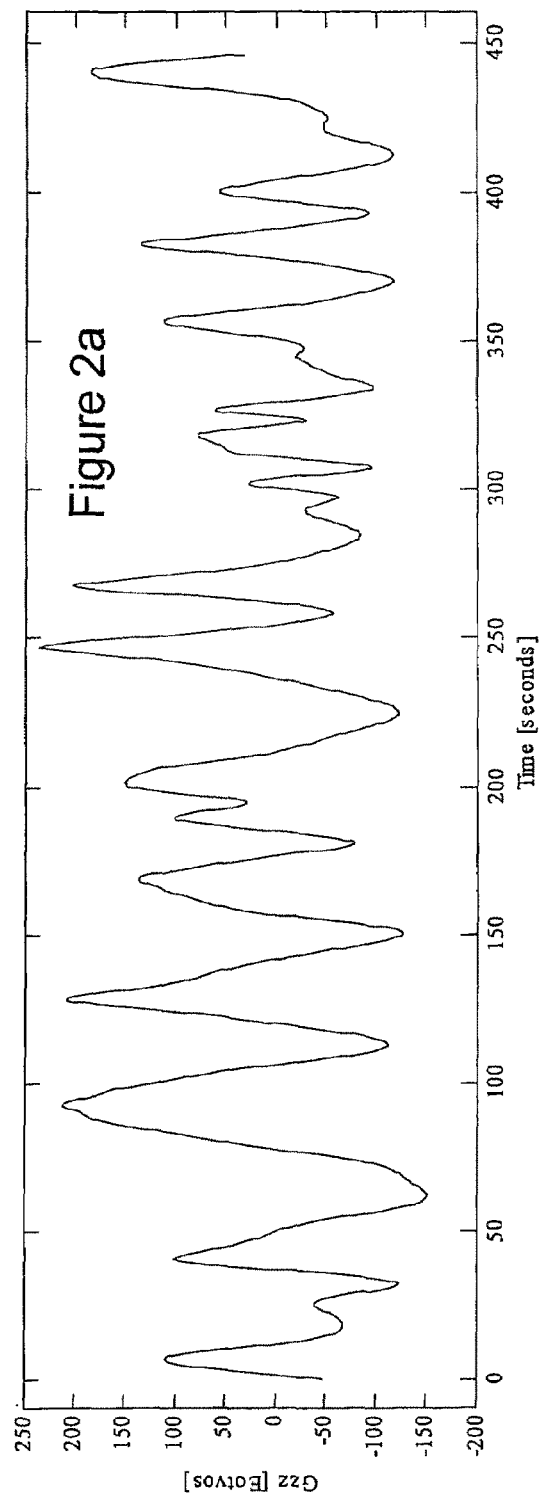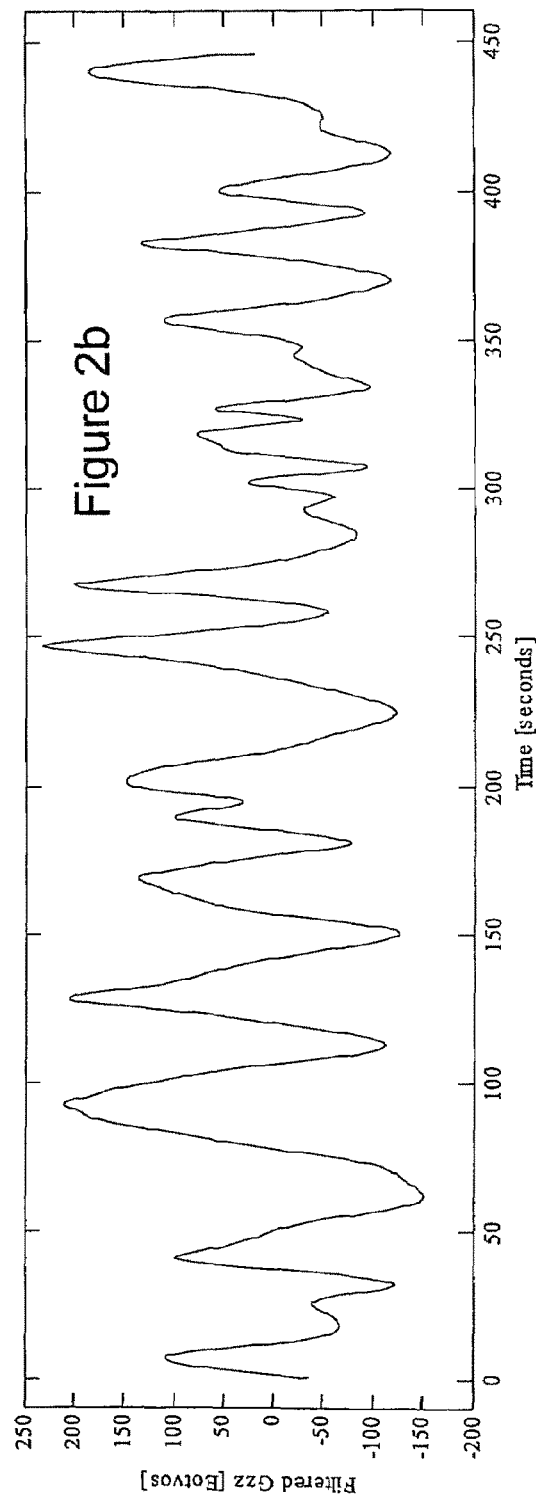

TERRAIN CORRECTION SYSTEMS

This application is the National Phase of PCT/GB2008/050113, filed Feb. 21, 2008, which claims priority to Great Britain Application No. 0705605.4, filed Mar. 23, 2007, the disclosures of which are hereby incorporated by reference in their entirety.

FIELD OF THE INVENTION

This invention relates to methods, apparatus and computer program code for processing data from potential field surveys to correct for the effects of underlying terrain. Embodiments of the techniques are particularly useful for processing data from airborne surveys, in particular gravity field surveys.

BACKGROUND TO THE INVENTION

In this specification we will refer to airborne surveys, and more particularly to gravity gradient surveys. However the techniques we describe are not limited to these types of survey and may be applied to other potential field surveys including, but not limited to, gravity surveys, magnetic field surveys such as magnetotelluric surveys, electromagnetic surveys and the like.

A potential field survey is performed by measuring potential field data which, for a gravity survey, may comprise one or more of gravimeter data (measuring gravity field) or gravity gradiometer data (measuring gravity field gradient), vector magnetometer data, true magnetic gradiometer data, and other types of data well-known to those skilled in the art. A common aim of a geophysical potential field survey is to search for signatures which potentially indicate valuable mineral deposits.

Conventionally airborne potential field surveys such as gravity surveys are flown on a grid pattern. The grid is defined by orthogonal sets of parallel lines (flight paths) on a two-dimensional surface which is draped over the underlying terrain. However the draped surface is constrained by the closest the aircraft is permitted to fly to the ground and the maximum rate of climb/descent of the aircraft. Some improved techniques for airborne potential field surveys, which facilitate the collection of data from close to the ground, are described in the applicant's co-pending PCT patent application "Gravity Survey Data Processing", PCT/GB2006/050211, hereby incorporated by reference in its entirety.

After the potential field data has been collected but prior to interpreting the data a terrain correction is generally applied, compensating for surface height variations. Surface data may be purchased in the form of digital terrain elevation data or determined from (D)GPS ((Differential) Global Position System) and/or airborne techniques such as LIDAR (Laser Imaging Detection and Ranging) and SAR (synthetic aperture radar). Aircraft acceleration, attitude, angular rate and angular acceleration data may also be used to correct the output data of the potential field instrumentation. We describe some improved techniques for terrain correction in geophysical surveys in our co-pending UK patent application "Terrain Correction Systems", no. 0601482.3, filed 25 Jan. 2006, also hereby incorporated by reference in its entirety.

Another technique, described in WO 03/032015, corrects measurements from geophysical instruments in real time at source from other navigation and mapping instruments carried by the aircraft. However in practice this type of "on-line" correction suffers from a number of drawbacks.

Thus there remains a need for improved data processing techniques. One problem, for example, arises where the terrain changes rapidly so that spatial aliasing can arise, more particularly where the terrain has peaks or other variations on a length scale which is less than the distance between the survey (flight) lines.

SUMMARY OF THE INVENTION

According to a first aspect of the invention there is therefore provided a method of processing potential field measurement data from a moving platform potential field survey for mapping a field, the method comprising: inputting said measured potential field data, said measured potential field data comprising data defining a time series of potential field measurements captured by a potential field measurement instrument mounted on a moving platform, each of said measurements having associated data defining positions of said measurements as a function of time; inputting terrain data defining a spatial variation of terrain surveyed by said potential field survey; determining time-domain correction data to be applied to said measured potential field data in the time-domain, said determining using said terrain data and said associated data defining positions of said measurements as a function of time; and adjusting said measured potential field data defining said time series of potential field measurements using said time-domain correction data to provide terrain corrected measured potential field data for said mapping of said field.

In embodiments the method is implemented off-line, after collection of the potential field data using the moving platform. The correction is however performed in the time-domain by means of a forward calculation from data in a terrain model database to the time series of measurement locations.

Preferably the determining of the time-domain correction data includes compensating for a bandwidth of the potential field measuring instrument. In embodiments this comprises filtering the time-domain correction data using a filter matched to the response, for example an impulse response, of the instrument. This may comprise, for example, integrating measurements over an integration time interval dependent upon a response of the potential field measurement instrument.

In some preferred embodiments the time-domain correction data comprises a set of calculated values of the measured potential field due to the terrain at three-dimensional positions in space along survey lines of the potential field survey. However in general these positions will not correspond to the actual recorded measurement positions. Instead preferably positions of the moving platform at regularly spaced intervals in time (and thus depend upon the speed of the moving platform). Thus, broadly speaking, the time-domain correction data comprises an effective component of the field measurement instrument data forward calculated from the terrain data at three-dimensional positions in space x(t), y(t), z(t) at substantially regularly spaced time intervals. This contribution to the potential field due to the terrain as a function of position in space of the moving platform at regular time intervals may then be subtracted from the actual potential field measurements to leave a signal of interest for further data processing, in particular due to underlying geological formations. Either or both of the actual, measured signal and terrain correction signal may optionally be extrapolated and/or interpolated so that corresponding data points substantially align for perforating the correction.

Preferably the method further comprises determining a set of field mapping parameters mapping the field using the adjusted measured potential field data. The skilled person will understand that there are many ways of achieving this including those mentioned in our earlier filed patent applications (ibid) and also in our UK patent application number 0701725.4 filed 30 Jan. 2007, all hereby incorporated by reference in their entirety.

The skilled person will understand that generally, when measuring potential field data, what is actually measured is gravity and/or gravity gradient (although other quantities derived from spatial derivatives of the potential field may additionally or alternatively be measured).

In some preferred embodiments the moving platform comprises an aircraft and the survey comprises an airborne potential field survey, but the techniques we describe may also be applied to marine or land-based potential field surveys from a water or land craft.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another, for example distributed across a network.

The invention further provides a data processing system configured to implement embodiments of the above-described methods.

Thus according to a further aspect of the invention there is provided a data processing system for processing potential field measurement data from a moving platform potential field survey for mapping a field, the system comprising: data memory for storing measured potential field data, said measured potential field data comprising data defining a time series of potential field measurements captured by a potential field measurement instrument mounted on a moving platform, each of said measurements having associated data defining positions of said measurements as a function of time, and for storing terrain data defining a spatial variation of terrain surveyed by said potential field survey; and program memory storing processor control code; and a processor coupled to said data memory and to said program memory to load and implement said control code, said code comprising code to: input said measured potential field data and said associated data for said measurements; input said terrain data; determine time-domain correction data to be applied to said measured potential field data in the time-domain using said terrain data and said associated data defining positions of said measurements as a function of time; and adjust said measured potential field data defining said time series of potential field measurements using said time-domain correction data to provide terrain corrected measured potential field data for said mapping of said field.

Preferably the code also comprises code to adjust the correction data by means of a matching filter to mimic a response of the measurement instrument.

BRIEF DESCRIPTION OF THE DRAWINGS

These and other aspects of the invention will now be further described, by way of example only, with reference to the accompanying figures:

FIG. 2a shows, schematically, variation of gravity gradient component $G_{zz}$ with time based on a forward calculation from the terrain model of FIG. 1 at regularly spaced time intervals and FIG. 2b shows the adjusted forward calculated data after filtering in the time domain using a filter to match the response of the measurement system;

DETAILED DESCRIPTION OF PREFERRED EMBODIMENTS

Where we refer to a field, in particular a gravity field, this is not limited to a vector field but includes scalar and tensor fields, a potential field and any derivatives deriving from the potential field.

Potential field data includes, but is not limited to, gravimeter data, gravity gradiometer data, vector magnetometer data and true magnetic gradiometer data. Elements and representations of a potential field may be derived from a scalar quantity.

Figure 1:
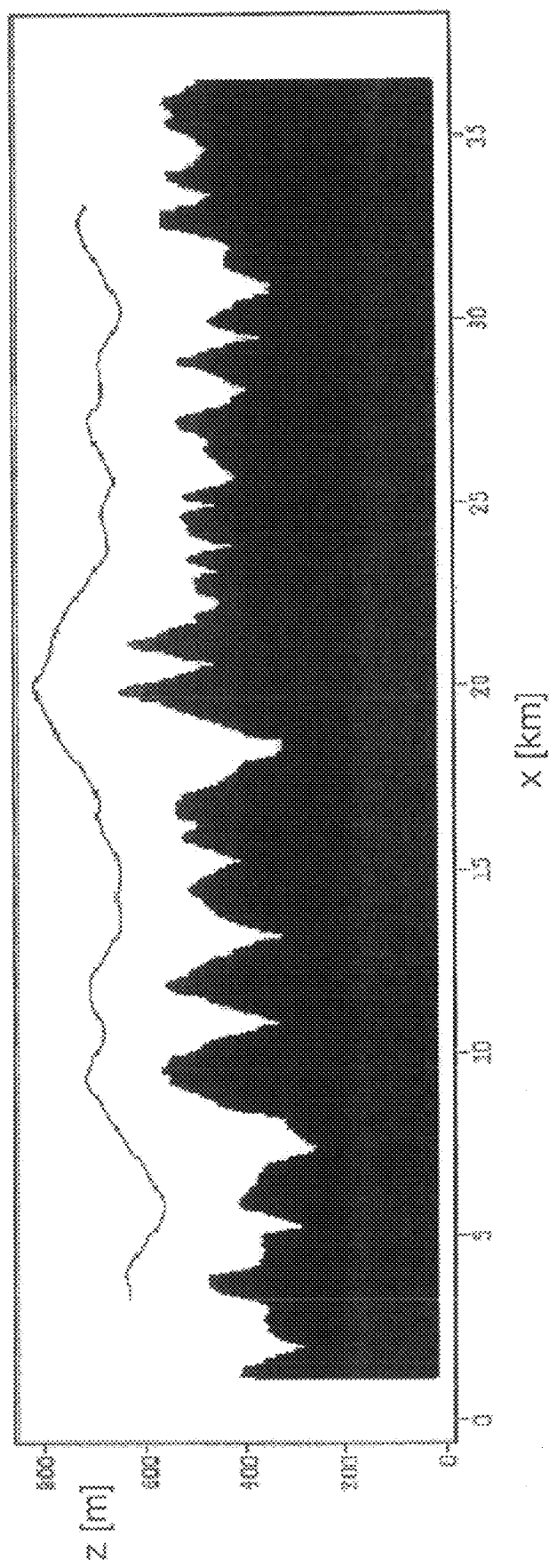
FIG. 1 shows, schematically, a graph of height against distance illustrating a section of terrain under a flight line of an airborne potential field survey.

Referring to FIG. 1, this shows an example survey flight line above terrain, in which the arrow shows the direction of flight.

Figure 3:
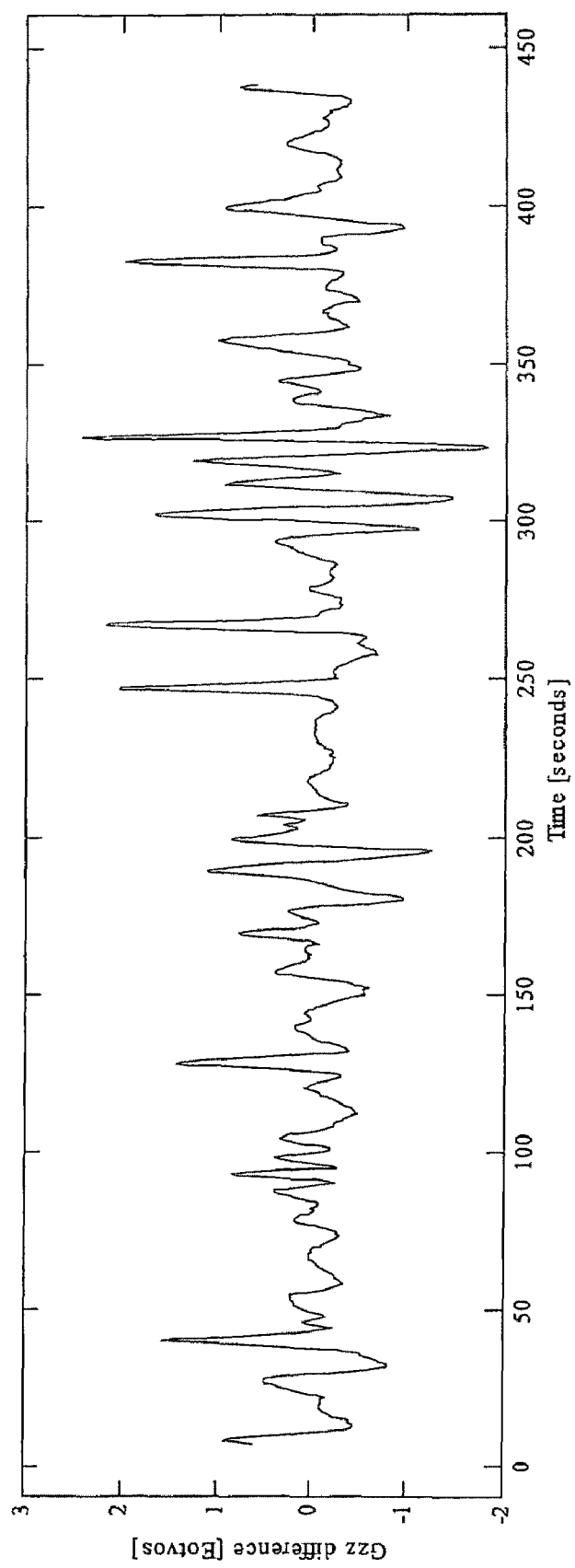
FIG. 3 illustrates the difference between the time domain terrain correction data before and after the filtering stage.

FIG. 2b shows forward calculated Gzz in the time domain and FIG. 2b shows the forward calculated Gzz after filtering to instrument bandwidth. FIG. 3 shows the difference between the curves of FIGS. 2a and 2b, showing the alteration of the terrain correction due to the filtering.

Time-Domain Correction Techniques

Figure 4:
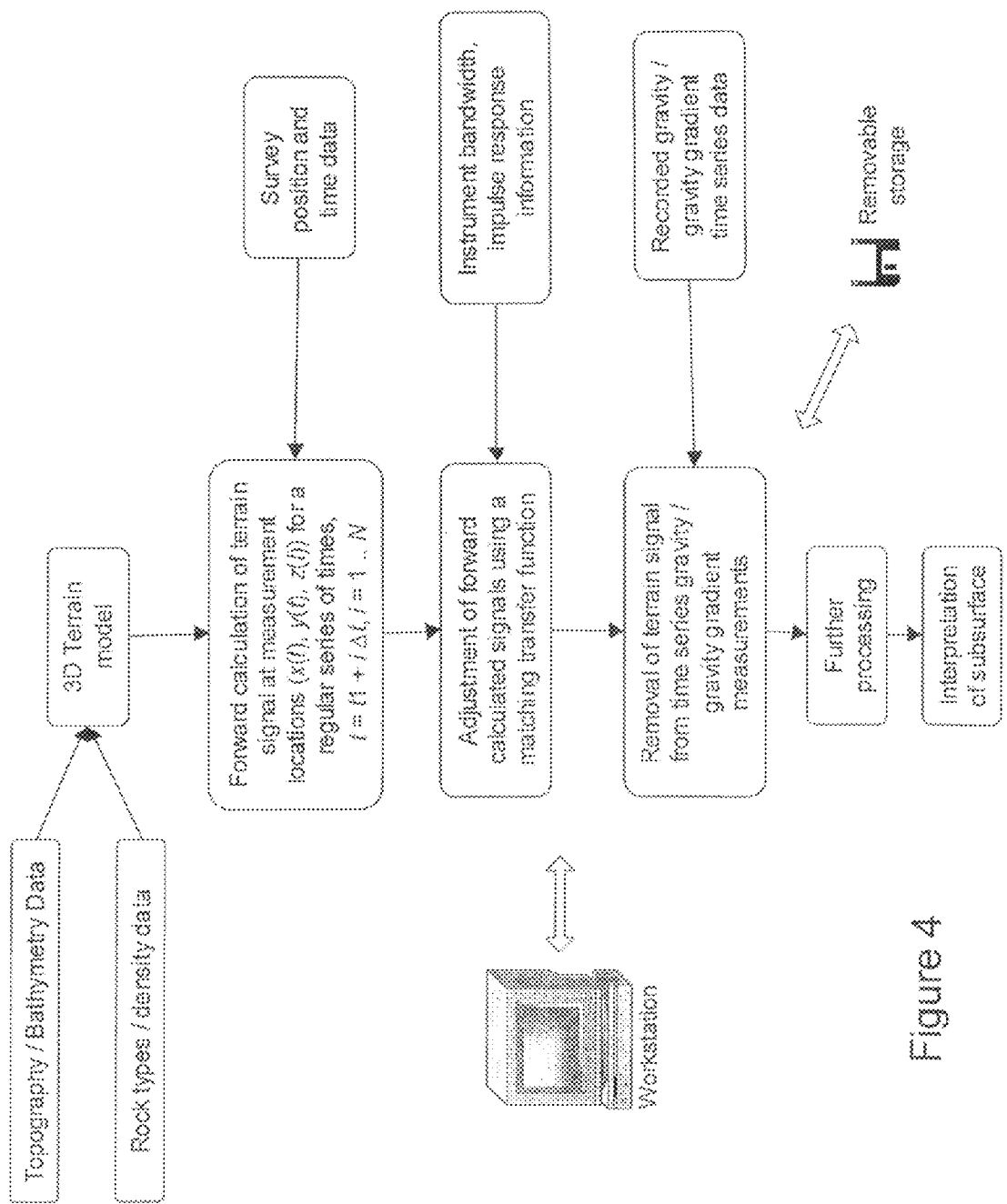
FIG. 4 shows, schematically, a flow diagram of a procedure for implementing an embodiment of a method according to the invention.

We now describe time-domain correction techniques, in particular with reference to FIG. 4.

The largest amplitude and bandwidth signal in a gravity field survey almost always comes from the topography. Often in gravity field interpretation the terrain signal is removed by a terrain correction performed during a late stage of the data processing. At this point, all sense of the time domain nature of the acquisition has been lost since the data has been manipulated using spatial techniques.

By performing a terrain correction early on in the processing sequence, when the data is still represented in the time domain, one can ultimately produce a better map of the underlying geology because the terrain correction can be matched more closely to the data that was actually recorded by the instrument. In particular, the time domain correction will correctly remove high frequency terrain signals which would otherwise be aliased in spatial analysis. Also, by performing the correction in the same domain as the measurement system, the actual transfer function of the measurement instrument can be incorporated into the correction data. This means that the terrain correction is removing the effect the terrain has on the recorded measurement data rather than removing the terrain signal itself. This is important especially for airborne surveys flown at low altitude over highly variable terrain since the bandwidth of the measurement system can significantly alter the high frequency terrain signals.

The preferred implementation of the time domain terrain correction system proceeds according to FIG. 4, which shows a flow diagram of steps involved in a preferred dynamic terrain correction; this procedure may be implemented in software on a carrier such as a disk, or in a computer system, as schematically illustrated.

The geometry of a 3D model of the terrain is constructed using available topography and bathymetry data. The assignment of density values within the model is guided by information originating from rocks types, well data or surface penetrating imaging techniques. The resolution of the model should be adequate to accurately recreate the surveyed potential field data from the terrain. Thus preferably the model has an extent which goes beyond the boundaries of the survey by a sufficient distance to render the contribution from terrain outside of the model negligible.

The terrain model is used to predict (forward calculate) the contribution that the terrain made to the total signal over the duration of the survey at a series of regular time intervals, $$t = t1 + i \Delta t \qquad (1)$$

where i is an integer and $\Delta t$ is the calculation sampling time. $\Delta t$ is chosen so that the resolution of the calculated terrain signal exceeds the measurement bandwidth of the instrument. For example, if the bandwidth is 0.5 Hz, the calculation sample time should be less than 1 second.

In practice, the terrain signal is calculated using the principle of superposition where the model is discretised into a set of finite volumes each of which having known mathematical functions to forward calculate the gravity field at a given set of field locations. The field points for these calculations are the locations (x(t), y(t), z(t)) and possibly the orientations (pitch, roll, yaw) of the instrument interpolated to the time series of equation (1).

The time series terrain forward calculated data is modified by means of a filter that is designed to mimic the response of the actual measurement. The design of this filter is accomplished by incorporating knowledge of the instrument bandwidth and its impulse response. An appropriate filter to perform this is a finite impulse response filter mathematically represented by a vector of filter coefficients. The filtered forward calculated terrain data then results by simple convolution with the filter.

The bandwidth matched terrain correction data is then resampled onto the time series of the recorded measurements and subtracted from them yielding a new set of raw measurement data ready for subsequent processing.

Although we have described the technique using the preferred example of an airborne potential field survey, embodiments may also be employed for marine potential field surveys conducted from a boat and, more generally, to potential field surveys conducted from other moving platforms or vehicles.

The techniques are not restricted to processing gravity data but may also be employed, for example, in processing magnetic field data. The measured potential field data may thus be obtained by measuring magnetic field and/or a flux density vector and/or its magnitude, for example using a measurement made with a magnetic gradiometer. If equivalent source elements are used they may then have, for example, a surface current density or a pole strength.

It will be understood that the invention is not limited to the described embodiments and encompasses modifications apparent to those skilled in the art lying within the spirit and scope of the claims appended hereto.

The invention claimed is:

1. A computer-implemented method of processing measured potential field data from a moving platform potential field survey for mapping a field, the method being implemented in a computer comprising a memory in communication with a processor, the method comprising:
    inputting, to said processor, said measured potential field data, said measured potential field data comprising data defining a time series of potential field measurements captured by a potential field measurement instrument mounted on a moving platform, each of said measurements having associated data defining positions of said measurements as a function of time;
    inputting, to said processor, terrain data defining a spatial variation of terrain surveyed by said potential field survey;
    determining, by said processor, time-domain correction data to be applied to said measured potential field data in the time-domain, said determining comprising:
        using said terrain data and said associated data defining positions of said measurements as a function of time; and
        compensating, by said processor, for a bandwidth of said potential field measuring instrument, wherein said compensating for said bandwidth comprises filtering, by said processor, said time-domain correction data using a filter matched to an impulse response of said instrument; and
    adjusting, by said processor, said measured potential field data defining said time series of potential field measurements using said time-domain correction data to provide terrain corrected measured potential field data for said mapping of said field.

2. A method as claimed in claim 1 wherein said determining of said time-domain correction data comprises performing, by said processor, a forward calculation from said terrain data to said time-domain measured potential field data.

3. A method as claimed in claim 1 wherein said time-domain correction data comprises a set of calculated values of said measured potential field due to said terrain at three-dimensional positions in space along survey lines of said potential field survey.

4. A method as claimed in claim 3 wherein said three-dimensional positions comprise positions of said moving platform at regularly spaced intervals in time.

5. A method as claimed in claim 1 wherein said method is implemented off-line, after collection of said measured potential field data using said moving platform.

6. A method as claimed in claim 1 further comprising determining, by said processor, a set of field mapping parameters mapping said field using said terrain corrected measured potential field data.

7. A method as claimed in claim 6 further comprising determining, by said processor, a map of said field using said field mapping parameters.

8. A method as claimed in claim 1 wherein said measured potential field data comprises gravity or gravity gradiometer data.

9. A method as claimed in claim 8 wherein said measured potential field data comprises data for gravity gradient component $G_{zz}$.

10. A method as claimed in claim 1 wherein said moving platform comprises an aircraft.

11. A carrier having a processor control code thereon that cause said processor to implement the method of claim 1.

12. A data processing system for processing measured potential field data from a moving platform potential field survey for mapping a field, the system comprising:
    data memory for storing measured potential field data, said measured potential field data comprising data defining a time series of potential field measurements captured by a potential field measurement instrument mounted on a moving platform, each of said measurements having associated data defining positions of said measurements as a function of time, and for storing terrain data defining a spatial variation of terrain surveyed by said potential field survey; and program memory for storing processor control code; and a processor coupled to said data memory and to said program memory to load and implement said control code, said control code comprising code to cause the processor to:

input, to said processor, said measured potential field data and said associated data for said measurements;

input, to said processor, said terrain data;

determine, by said processor, time-domain correction data to be applied to said measured potential field data in the time-domain, said determining comprising:

using said terrain data and said associated data defining positions of said measurements as a function of time; and compensating, by said processor, for a bandwidth of said potential field measuring instrument, wherein said compensating for said bandwidth comprises filtering, by said processor, said time-domain correction data using a filter matched to an impulse response of said instrument; and adjust, by said processor, said measured potential field data defining said time series of potential field measurements using said time-domain correction data to provide terrain corrected measured potential field data for said mapping of said field.

13. A data processing system as claimed in claim 12 wherein said determining of said time-domain correction data includes compensating for a bandwidth of said potential field measuring instrument.

* * * * *